United States Patent Office 3,284,129
Patented Nov. 8, 1966

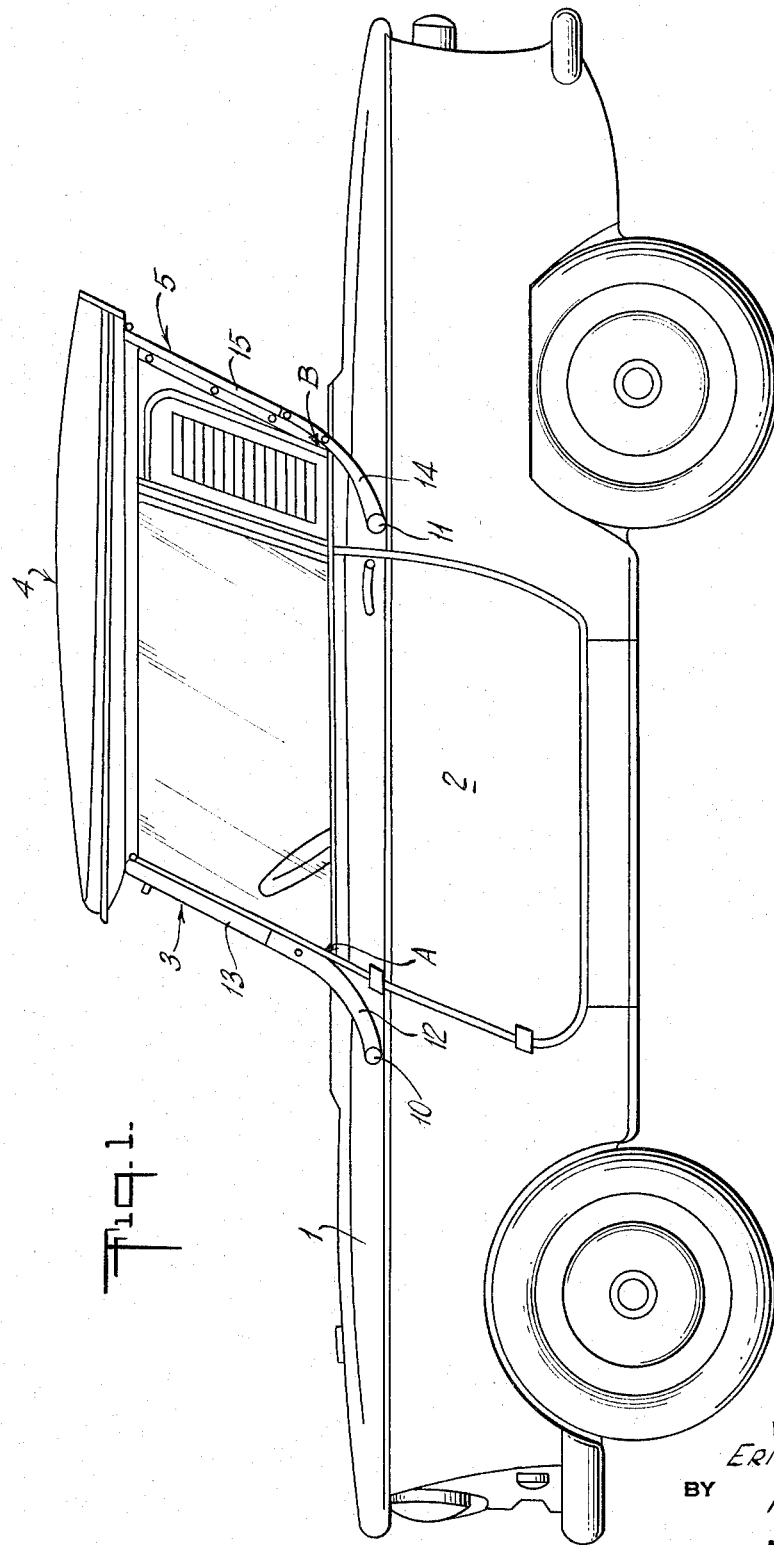

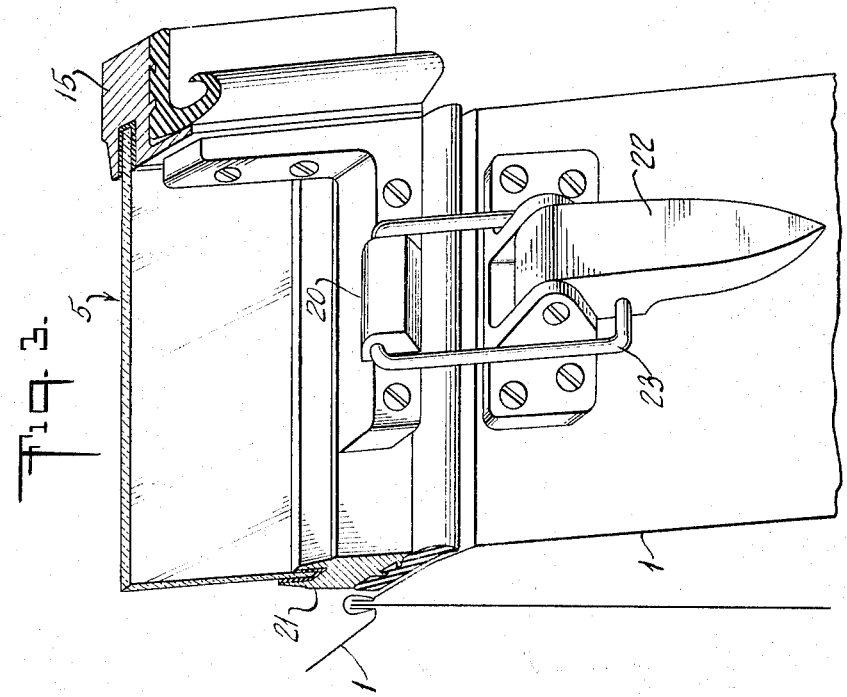
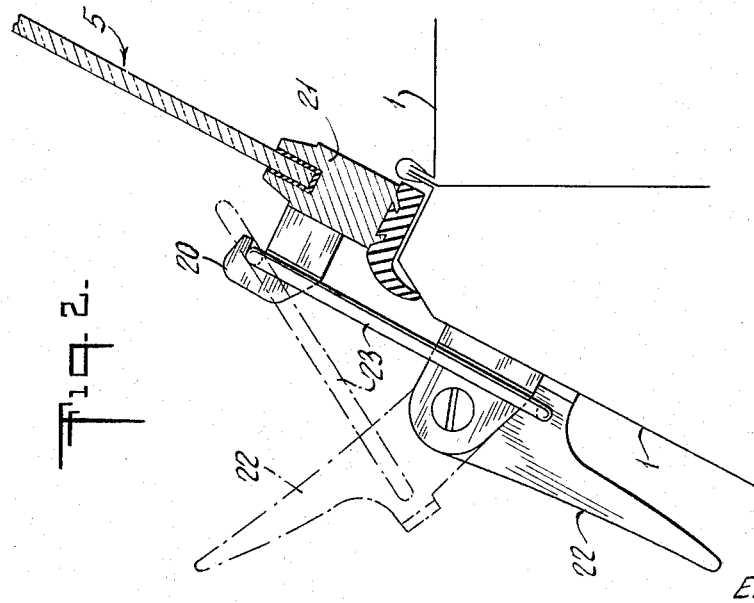

3,284,129
COLLAPSIBLE VEHICLE
Eric Jaulmes, Paris, France, assignor to Ateliers De La Motobecane, Pantin, Seine, France, a corporation of France
Filed Oct. 7, 1964, Ser. No. 402,245
Claims priority, application France, Oct. 9, 1963, 950,005
2 Claims. (Cl. 296—27)

The present invention relates to collapsible vehicles, preferably automotive vehicles of the type disclosed by and described in my co-pending patent application Serial No. 354,565, filed March 25, 1964, entitled Collapsible Vehicle, the present application being a continuation-in-part of said copending application.

There is described in said prior application a collapsible vehicle suitable for taking up a road position and a collapsed or garage position in which latter its height is considerably less, by reason of the fact that the superstructure of the vehicle composed of the windshield, the roof and the rear windows form three faces of a jointed paallelepiped with the windshield and the rear window pivoting in their lower parts on the body of the vehicle and in their upper part on the roof, in such a manner as to be able to lie down horizontally towards the front or hood in the collapsed position of the vehicle.

According to the prior construction, the superstructure is fixed in the road or operative position by latches, one of the component parts of which is fixed to the uprights of the windshield on the inner face of the latter, while the other part is fixed to the body. Thus, the locking occurs solely between the windshield and the body, and it can be understood that this solution should have been adopted because the latches are thus readily within reach of the driver.

The present invention has for its object an improvement in the construction and actuation of the referred to collapsible vehicle, whereby to usefully increase its stability and rigidity in the road position, thus permitting an economy in weight and price.

This improved result is obtained by making the roof of the vehicle take part in the load-carrying structure, in such a manner as to correspondingly relieve the rest of the construction. The roof is particularly well fitted to assume this additional function, in that it already constitutes, for other reasons of both construction and manufacture, a component of great rigidity and of relatively substantial cross-section.

With the foregoing object in view, the invention involves generally the provision of a latching arrangement, preferably but not necessarily identical to the latching arrangement or mechanism which serves to fix or lock the windshield and the body, for fixing or locking in the same manner the rear window and the body of the vehicle. The cooperating latching elements are secured, on the one hand, to the body and, on the other hand, to the lateral uprights and/or cross bar of the rear window, in a manner similar to the construction and operation of the front latches, as will become further apparent as the description proceeds.

The invention, both as to the foregoing and ancillary objects as well as novel aspects thereof, will be better understood from the following detailed description, taken in conjunction with the accompanying drawings forming part of this specification and in which:

FIG. 1 shows a side view of a collapsible vehicle according to the principal patent application, the vehicle being shown in the road position.

FIG. 2 is a more detailed fragmentary view showing in side elevation a locking latch for the rear window constructed according to the invention; and FIG. 3 is a perspective view of the latching arrangement shown by FIG. 2 and associated elements.

Referring more particularly to FIG. 1 of the drawings, there is shown a collapsible vehicle of the referred to type according to the principal patent application, comprising a body 1, a pair of doors 2 and a collapsible superstructure composed of the windshield 3, the roof 4 and the rear window 5 of the vehicle. At the front and at the rear of the openings provided for the doors 2, the body carries horizontal pivots 10 and 11 located in a common horizontal plane. On the pivot 10 there is jointed a bent arm 12 which extends downwards from the lateral uprights 13 of the windshield 3. In the same manner, bent arms 14 extending downwards the lateral uprights 15 of the rear window 5 are jointed on pivots 11.

The uprights 13 and 15 are parallel and of the same length, as are the arms 12 and 14. As a consequence, they form the two opposite sides of a jointed parallelepiped of which the third side is constituted by the roof 4. Under these conditions, the roof can be moved, by pivoting about 10 and 11, from the operative or road position shown in the drawing to a collapsed or garage position, in which the windshield 3 is laid upon the front or hood of the vehicle, the roof rests upon the windsield and the rear window is, in turn, laid horizontally behind the windshield and covering the driver's seat, in the manner shown and described in further detail in the above-mentioned principal application, to which reference is made for further details relative to the construction and operation of the vehicle forming the subject of the invention.

There is indicated at A in FIG. 1 the position of the latching arrangement of the windshield described in the principal application. According to the improvement of the instant application, a similar or equivalent latching mechanism is provided at B, in an effort to fix or lock the body and the uprights 15 and/or cross arm of the rear window.

The inclusion of the additional latching arrangement has the effect, among others, of making the uprights 15 and arm 14 comparable to an encastered beam, whereby to transmit to the roof 4 the stresses due to deformations or vibration of the body 1, as is already the case for the uprights 13 and arm 12 of the windshield 3. The circuit of forces is thus completed and, accordingly, the roof takes part in resisting shocks and deformations of the vehicle, in proportion to its own rigidity.

The vehicle according to the principal application is thus substantially reinforced by means which are at the same time relatively simple and of small weight.

FIGS. 2 and 3 show the preferred latching mechanism being similar to that for the windshield 3 as shown by the principal application.

The latching arrangement for the locking of the rear window which may be similar to the latch arrangement of the windshield 3 preferably is of the stirrup type as shown in the drawing, including a latch or element 20 fixed to the window cross bar 21 and to the uprights 15 of the rear window, on the inner face of the latter, and a cooperating part 22 being fixed to the body 1. The stirrup carried by part 22 and locking with the latch 20 is indicated at 23. In the drawing, there is shown the latched or locked position in full lines, the released or inoperative position being indicated in dot-dash lines, respectively. Both latching arrangements for the windshield and rear window serve to prevent, aside from other functions and advantages, in the event of an abrupt braking of the vehicle, unexpected or violent collapse of the superstructure on the neck of the driver, as a result of the effects of inertia.

In the foregoing the invention has been described in reference to a specific illustrative device. It will be evident, however, that variations and modifications, as well as the substitution of equivalent elements for those shown, may be made without departing from the broader scope and spirit of the invention as set forth in the appended claims.

I claim:

1. In a collapsible vehicle of the type described having a body, at least two opposite doors therein, a horizontal hood extending from the front of and a driver's seat disposed within said body; a collapsible superstructure comprising a windshield and a rear window both of the same vertical dimension and a roof, means pivotally mounting said windshield and said rear window at their lower parts upon said body in front of and behind, respectively, the openings provided by said doors, further means pivotally mounting the front and rear parts of said roof to the upper ends of said windshield and said rear window, respectively, whereby to form a jointed parallelepiped by said superstructure in its road position and to enable the same to be operated to a collapsed garage position with said windshield overlying said hood, with said roof resting upon the windshield and with said rear window overlying said seat behind said wind-shield, and a pair of latching means each having a first part secured to said windshield and rear window, respectively, and a pair of cooperating latching parts secured to said body, to firmly lock both said windshield and rear window to said body in the road position of said superstructure.

2. In a collapsible vehicle as claimed in claim 1, including lower supporting cross bars for said windshield and rear window, each of said latching means consisting of a first latching element secured to one of said cross bars and a cooperating catching element secured to said body.

References Cited by the Examiner

UNITED STATES PATENTS 2,382,635  8/1945  Humer _____ 296—107

FOREIGN PATENTS 117,765  8/1918  Great Britain.
351,846  3/1961  Switzerland.

BENJAMIN HERSH, *Primary Examiner.*

P. GOODMAN, *Assistant Examiner.*